United States Patent

Sun et al.

[11] Patent Number: 5,818,032
[45] Date of Patent: Oct. 6, 1998

[54] ENCODED COLOR HALFTONE MICRO-DOTS FOR HIGH DENSITY DIGITAL INFORMATION STORAGE

[76] Inventors: Tsu-Hung Tom Sun, 22909 Wade Ave., Torrance, Calif. 90505; Savina Yu-Sheng Wu, 30112 Avenida Tranquila, Rancho Palos Verdes, Calif. 90275

[21] Appl. No.: 778,652

[22] Filed: Jan. 3, 1997

[51] Int. Cl.[6] .................................................. G06K 19/06
[52] U.S. Cl. ........................... 235/494; 235/469; 283/93; 283/114
[58] Field of Search ................................... 235/494, 465, 235/469, 470, 380, 493, 462; 283/93, 114

[56] References Cited

U.S. PATENT DOCUMENTS

| | | | |
|---|---|---|---|
| 4,874,936 | 10/1989 | Chandler et al. | 235/494 |
| 5,153,418 | 10/1992 | Batterman et al. | 235/494 |
| 5,170,044 | 12/1992 | Pastor | 235/494 |
| 5,202,552 | 4/1993 | Litttle et al. | 235/494 |
| 5,315,098 | 5/1994 | Tow | 235/469 X |
| 5,369,261 | 11/1994 | Shamir | 235/494 |
| 5,426,289 | 6/1995 | Kinoshita et al. | 235/494 X |
| 5,484,999 | 1/1996 | Priddy et al. | 235/494 |
| 5,572,010 | 11/1996 | Petrie | 235/494 |
| 5,576,532 | 11/1996 | Hecht | 235/494 |
| 5,612,524 | 3/1997 | Sant'Anselmo et al. | 235/494 |
| 5,686,718 | 11/1997 | Iwai et al. | 235/494 |
| 5,694,102 | 12/1997 | Hecht | 235/494 X |
| 5,717,197 | 2/1998 | Petrie | 235/494 |
| 5,726,435 | 3/1998 | Hara et al. | 235/494 |
| 5,736,724 | 4/1998 | Ju et al. | 235/462 |

FOREIGN PATENT DOCUMENTS

| | | |
|---|---|---|
| 0-670-555-A1 | 9/1995 | European Pat. Off. . |
| 5-174204 | 7/1993 | Japan . |

*Primary Examiner*—Donald Hajec
*Assistant Examiner*—Michael G. Lee
*Attorney, Agent, or Firm*—Irving Keschner

[57] ABSTRACT

Apparatus and method for storing large amount of digital data into the color halftone micro-dots generated by high resolution color laser or ink jet printers or lithography on a substrate, such as paper. A data cell composed of color halftone micro-dots is encoded with multi-bit digital binary data. The size of the data cell is determined by the resolution of the color printer and the color scanner, the density of the cyan, yellow, magenta and black inks and the reflectance of the red, green and blue lights, in order to meet the requirement of decoding the multi-bit binary data with enough noise immunity. Collections of data cells in a two-dimensional matrix forms a data block. The data block is enclosed with an exterior data cell border with predetermined data pattern and is used to determine the spacing of the data cell, the orientation of the data block and reflectance of the data cells during scanning and data reconstruction. A parity bit for each digital byte and extensive two-dimensional error detection and correction scheme for the data block are implemented. With the utilization of 600 dot per inch high resolution color printers and scanners, a data cell of 10 mil by 10 mil size and encoded with 3-bits binary data equivalent to 3,000 bytes of digital data stored in a 1 inch square paper.

9 Claims, 10 Drawing Sheets

FIG. 1

| DATA CELL TYPE | RENDERED IMAGE | PIXEL VALUE FOR CYAN | PIXEL VALUE FOR YELLOW | PIXEL VALUE FOR MEGENTA | PIXEL VALUE FOR BLACK | EQUIVALENT BINARY DATA |
|---|---|---|---|---|---|---|
| 0 | | 255 | 255 | 255 | 255 | 000 |
| 1 | | 255 | 0 | 255 | 0 | 001 |
| 2 | | 0 | 0 | 255 | 0 | 010 |
| 3 | | 0 | 255 | 255 | 0 | 011 |
| 4 | | 0 | 255 | 0 | 0 | 100 |
| 5 | | 255 | 0 | 0 | 0 | 101 |
| 6 | | 255 | 255 | 0 | 0 | 110 |
| 7 | | 0 | 0 | 0 | 0 | 111 |

FIG. 3

| DATA CELL TYPE | RENDERED IMAGE | PIXEL VALUE FOR CYAN | PIXEL VALUE FOR YELLOW | PIXEL VALUE FOR MEGENTA | PIXEL VALUE FOR BLACK | EQUIVALENT BINARY DATA |
|---|---|---|---|---|---|---|
| 0 | | 255 | 255 | 255 | 255 | 000 |
| 1 | 92 | 123 | 0 | 123 | 0 | 001 |
| 2 | 96 | 0 | 0 | 123 | 0 | 010 |
| 3 | 100 | 0 | 255 | 123 | 0 | 011 |
| 4 | 104 | 0 | 255 | 0 | 0 | 100 |
| 5 | 108 | 123 | 0 | 0 | 0 | 101 |
| 6 | 112 | 123 | 255 | 0 | 0 | 110 |
| 7 | | 0 | 0 | 0 | 0 | 111 |

90- 94- 98- 102- 106- 110-

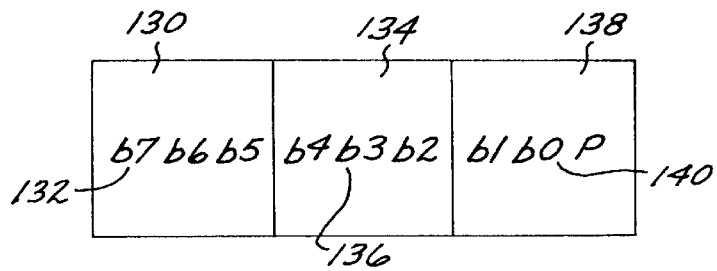
FIG. 5A
FIG. 5B
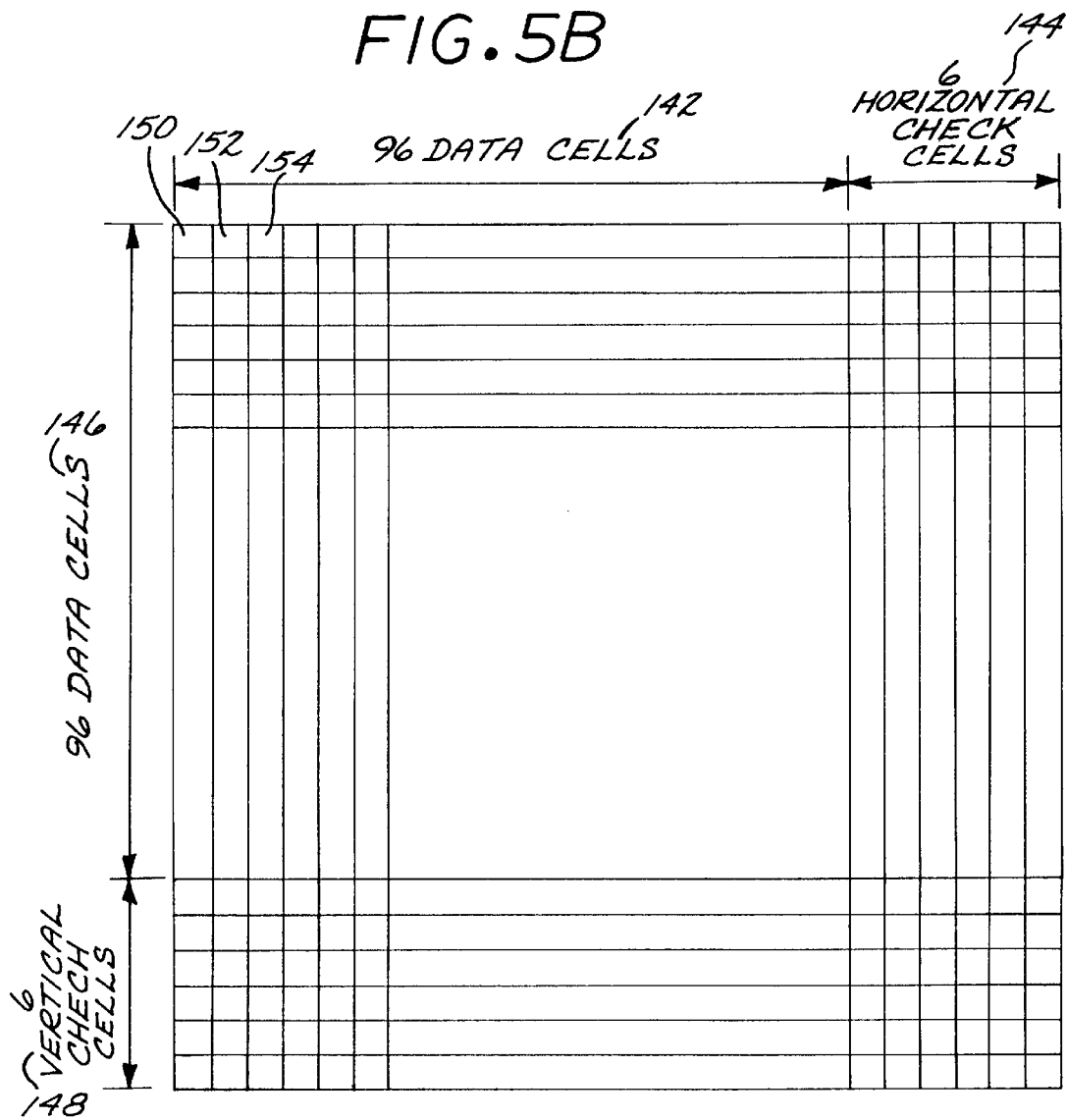

FIG. 9

| 1 | 2 | 3 | 4 | 5 | 6 | 7 | 8 | 9 | 10 | 11 | 12 | 13 | 14 | 15 |
|---|---|---|---|---|---|---|---|---|----|----|----|----|----|----|
| 2 | 2 | 0 | 3 | 1 | 2 | 3 | 3 | 0 | 3 | 3 | 0 | 3 | 3 | 6 |

PINK, BLACK, ORANGE, PURPLE

FIG. 11

96 DATA CELLS — TYPE1, TYPE2 — 6 HORIZONTAL CHECK CELLS

FIG. 12

| $r^5$ | $r^4$ | $r^3$ | $r^2$ | $r^1$ | $r^0$ |
|---|---|---|---|---|---|
| 011 | 101 | 010 | 001 | 000 | 111 |

ENCODED COLOR HALFTONE MICRO-DOTS FOR HIGH DENSITY DIGITAL INFORMATION STORAGE

BACKGROUND OF THE INVENTION

1. Field of the Invention

The present invention relates to a nonvolatile electro-optical read-only memory, comprising a substrate on which is printed a two-dimensional array of half-tone color micro-dot symbols encoded with multi-bit digital binary data for high density information storage and a method for forming the symbols.

2. Prior Art

Black and white high-density two-dimensional bar code symbology to increase the amount of information stored in one-dimensional bar codes printed symbol are well-known. Examples of such two-dimensional bar codes is disclosed in U.S. Pat. Nos. 5,304,786 and 5,504,322. Increases in the density of the two-dimensional black and white bar codes is limited by the printer and scanner resolution, the alignment of the printed bar-code symbol and the error rate during scanning and data reconstruction. Multiple colors have also been utilized in the art of producing micro-labels having color bar codes, as described in the U.S. Pat. No. 5,129,974 and U.S. Pat. No. 5,118,369. However, systems of the type described are typically mainly used for micro-labeling a miniature semiconductor integrated circuit in the fabrication process.

Using color coding to increase the amount of information stored on a label is disclosed in U.S. Pat. Nos. 4,824,144, 4,846,503 and 4,889,367. To increase the data carrying capacity of data arrays, codes employing multiple high density color dots have been developed as described in U.S. Pat. No. 4,488,679. The multi-color code and the code reading system described therein uses five contrasting colors for the printing of the code. Multiple dots form blocks to represent different symbols.

U.S. Pat. No. 4,874,936 discloses a data array comprised of information encoded hexagons contiguously arranged in a honey comb pattern with at least two different optical properties. U.S. Pat. No. 5,369,261 discloses a dense multi-color information encoding system employing super pixel dots having differently colored sub-regions within them, arranged with side-by-side colors or with colored regions stacked one on top of the other such that information from one dot has as many color variables as there are stacked layers or mixed layers. For each color region with the super dot, there are as many as 64 intensities. However, the coding scheme, the code recording system and the code reading system described therein can only be implemented with a 3 layer color film exposed by color CRT screen which carries all the information for imaging, and a reader with white light source plus red, green, and blue filters, such that each monochromatic color beam shines one at a time and the intensities of the reflected light detected by the CCD sensor array, are used to calculate each colorant intensity and to decode the information stored in the super pixel dot. The super pixel dot coding scheme cannot be applied to the color laser printer or ink jet printer, because the printer pixel is a half tone dot with a combination of cyan, yellow, magenta and black inks only.

A color code using a combination of column marks and column phase marks to solve the problem of reading out correct data even in the case when applied to substrates which stretches such as linen products and the like, is disclosed in U.S. Pat. No. 5,426,289. The decoded data are obtained by referencing combinations of 3 color phase marks to a predetermined color code table during the read out process. The coding scheme disclosed therein, solves the problem of reliable data read out for stretchable substrates by sacrificing the density of information storage.

Although the various patents set forth hereinabove describe various techniques for encoding high density digital information on different substrates, they are typically complex and expensive to implement. In addition, the coding schemes cannot be used with currently available color laser or ink jet printers.

What is thus desired is to provide a method and apparatus for encoding high density digital information in dot form on a media which utilizes conventional color laser or ink jet printers to reduce costs for the user.

SUMMARY OF THE PRESENT INVENTION

The present invention provides a novel two-dimensional symbology for storing large amount of digital encoded data representing a compressed color image or text data file. The symbology may be used to create a nonvolatile read-only memory on a substrate, such as paper, which can be used in computer systems as an information storage unit. Storage capacities of up to 3 kilobytes of memory within an area of one square inch is achievable with the technique of the present invention.

In particular, the basic data storage unit of the present invention is a data cell comprising two-dimensional half-tone micro-dots of the same color, printed by a color laser printer, a color inkjet printer or lithography. Each data cell is encoded with multi-bit digital data represented by colors of the data cell. Each data cell with unique color is a data type representing a unique combination of the multi-bit digital binary data. The number of color half-tone micro-dots per data cell is determined by the resolution of the color printer and the resolution of the color scanner. Data cells of 6 dots by 6 dots or 10 mil by 10 mil is achieved with a 600 spot per inch color laser printer and color CCD scanner. Each data cell represents a multi-bit digital binary data, multiple neighboring data cells forming a digital byte. A data block is a collection of data cells in a two-dimensional matrix of many rows and many columns to represent the complete digital data file. The data block is enclosed by a boarder-cell ring with each data cell having a pre-determined color or data type, the boarder-cell ring providing information about the data block orientation, spacing between the data cells, and the expected pixel values of different data types during data decoding.

The color data cell for each unique data type is defined by specifying the pixel values in C(cyan) Y(yellow) M(magenta) K(black) color space within the image file sent to the printer. Each unique data type represents a specific multi-bit digital binary data, and the total numbers of unique data types is equal to the total number of different combinations of the multi-bit binary data. By using the primary inks of the printer, e.g., cyan, magenta, yellow, black, 8 unique data types with each data type representing 3-bit binary data is achieved in the present invention. By varying the pixel values in cyan and magenta color separations, data types containing light cyan and light magenta colors can be produced through halftoning and screening mechanisms within the printer.

On reading, or decoding, the printed color data cell is scanned with a high resolution color CCD scanner or other reading device to measure data cell reflectance of red, green or blue lights. To decode the data cells into binary digital data, the measured pixel value of each data cell in R(red) G(green) B(blue) color space is compared with expected pixel values of each data type. Two threshold values in each R, G, B color component is defined based upon the pixel value readings of the expected data types. It is desirable that the expected pixel values of different data types in RGB color space are farther apart from each other so that there is enough distance between the threshold values in order to provide better noise immunity. The present invention discloses an algorithm to decode the measured pixel values of each data cell into 3-bit binary data by comparing the pixel values with the threshold in each color component.

Error detection and correction methods are incorporated in the data block of the present invention. A parity bit is included in each digital byte represented by multiple horizontal neighboring data cell, to provide parity checking for error detection of odd number of bits errors on reading. Each horizontal row within the data block is composed of data cells and horizontal Reed-Solomon check cells. Each vertical column within the data block also contains data cells and vertical Reed-Solomon check cells, providing the capability of detecting and correcting multiple data-cell errors in each row and each column.

The present invention thus provides a method and apparatus for creating a high density two-dimensional color symbology for storing a digital text file or a compressed color image file by using a computer together with a color laser printer, color inkjet printer or lithography and decoding the printed symbology into a text file or decompressed color image by using a computer and a CCD color scanner or other reading device.

The present invention further provides a method and apparatus for coding multi-bit digital data with color data cells based upon printer pixel values specified for each color separation and measured scan image pixel values of the data cells for maximum noise immunity and a decoding algorithm based upon multiple threshold values for each color component. The present invention thus accomplishes the encoding/decoding process simpler and less expensive but more precise and reliable than currently available systems for encoding/decoding color halftone dots.

DESCRIPTION OF THE DRAWINGS

For a better understanding of the invention as well as other objects and further features thereof, references made to the following description which is to be read in conjunction with accompanying drawings wherein;

FIG. 1 illustrates an encoding table of eight data types of color data cell to represent 3-bit binary digital data using combination of cyan, magenta, yellow and black inks of the color laser printer, with input pixel values specified for each data type;

FIG. 3 illustrates a modified encoding table of eight unique data types of color data cell to represent 3-bit binary digital data using combinations of light cyan, light magenta, yellow and black colors of the color laser printer, where light cyan and light magenta colors are generated by the halftoning and screening mechanism within the printer by specifying smaller pixel values for the cyan and magenta color separations;

FIG. 4 is a normalized plot of pixel values in RGB color space measured with a CCD color scanner to obtain the light reflectance values of red, green and blue lights for eight data types coded with FIG. 3 modified coding table;

FIG. 5a shows a digital byte coded by 3 adjacent color data cells with the first data cell representing the 3 most significant bits b7 b6 b5, the second data cell representing bits b4 b3 b2, and the third data cell representing the 2 least significant bits b1 b0 and a parity bit P;

FIG. 5b is a two-dimensional 102 rows by 102 column data block for digital information storage with each row comprising 96 data cells plus 6 horizontal check cells for horizontal error detection and correction, and each column comprising 96 data cells plus 6 vertical check cells for vertical error detection and correction;

FIG. 9 is an example of the word "Hello" encoded with 15 color data cells;

FIG. 11 is an example of the first row of data block with 96 data cells starting with data type 7, followed by data type 2, data type 1, etc., plus 6 horizontal check cells at the end generated by the Reed-Solomon error correction code;

A FIG. 12 is an example of horizontal check cell generation by finding the remainder of dividing the data cell polynomial by the encode polynomial;

DETAILED DESCRIPTION OF THE INVENTION

Figure 2:
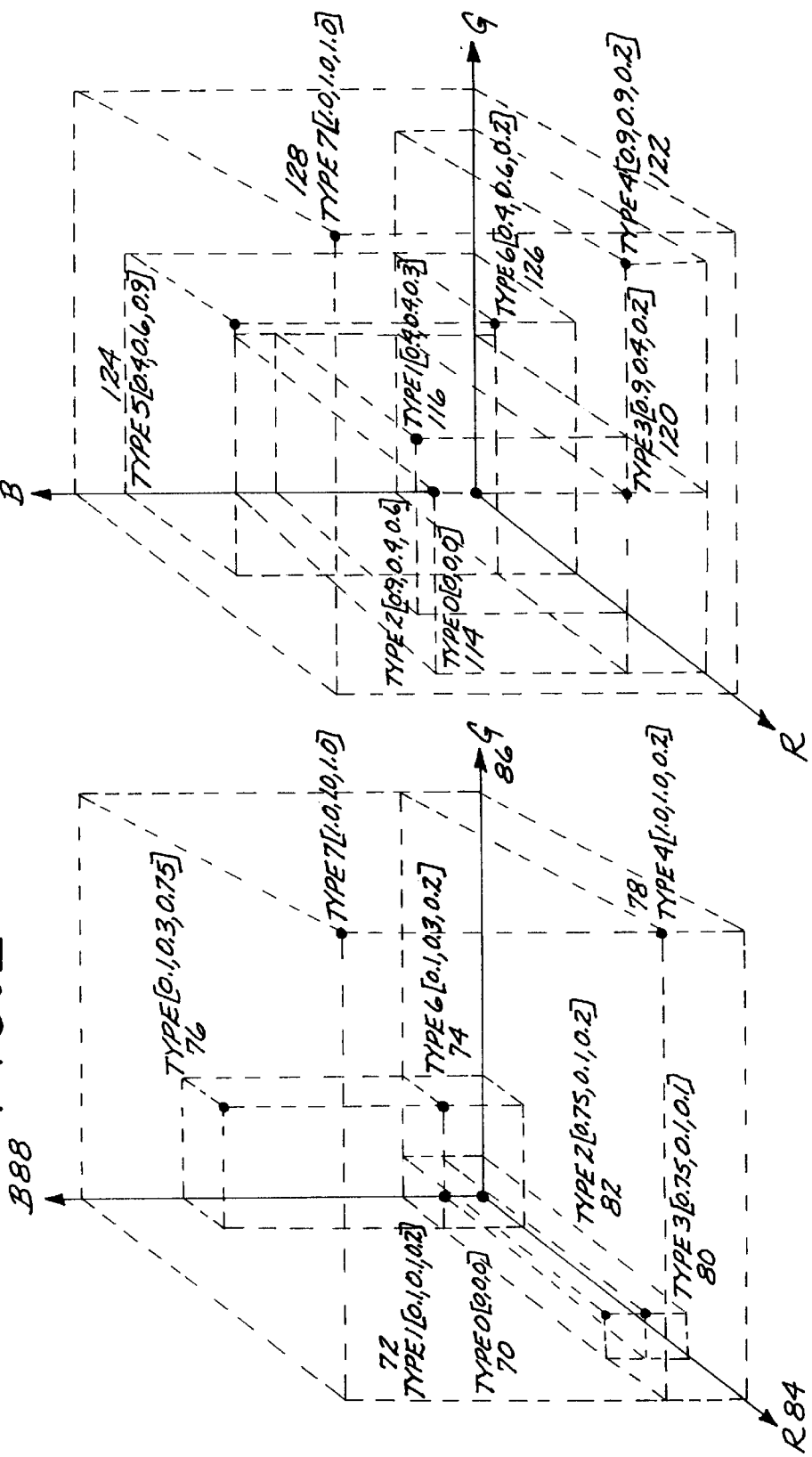
FIG. 2 is a normalized plot of pixel value in RGB color space measured with a CCD color scanner to obtain the light reflectance values of red, green and blue lights for eight data types coded with FIG. 1 encoding table.

Most widely used common printing processes including lithography, laser printer, ink jet, thermal transfer, etc. are halftone devices and binary in nature. Color images are typically rendered with four different color separations: cyan, yellow, magenta and black. For each color separation, the printer will either print the corresponding color ink on the output spot or skip printing the corresponding color ink on the output spot depending upon the binary image. The printed inks have no shades. Therefore, the printer can only output one of the sixteen combinations of cyan, yellow, magenta and black inks for each laser spot. To represent continuous tone color images with different colors and shades, halftoning techniques including screening and error diffusion are used to preserve the local average appearance of different color and shading. Electronic screening is a technique to create halftone dots of varying sizes and shapes for each color separation, by comparing color space pixel values within a halftone cell of a fixed number of laser spots, to a threshold matrix table. The varying sizes and shapes of the halftone dots of the cyan, yellow, magenta and black colors in combination are used to reproduce a continuous tone color image with different colors and shading. For most color laser printers, the hardware and software to implement the halftoning function reside inside the printer. Image files interfacing with the printers are generally described with industry's standard high level description language, such as Adobe's Postscript Description Language, and the color pixel values for the image are described in continuous tone in different color space. In CYMK color space, each pixel can be represented by a 32-bit binary data:

$$P=\{C, Y, M, K\}$$

where each color component C (cyan), Y (yellow), M (magenta), K (black) can be represented by a 8-bit binary data having a value from 0 to 255.

Data cell 10 is the information storage unit of the present invention. Each data cell 10 is composed of fixed number of color laser printed dots. Using a 600 spot per inch high resolution color laser printer, a 10 mil by 10 mil data cell 10 comprises 6 dots by 6 dots or a total of 36 halftone color micro-dots. In order to encode multiple bit digital binary data 12 with different color data cells, different discrete data cells with specific input pixel values has to be defined. To represent a 3-bit binary digital data for each colored data cell, eight discrete data cells have to be defined, assuming pixel values for each pixel inside the data cell are identical. FIG. 1 illustrates a coding method to digitize data cells to represent 3-bit binary digital data 12 by specifying eight different pixel values of C 14, Y 16, M 18 and K 20 color components for the input pixels of the data cell. The rendered image 51 by the color laser printer for the corresponding data cell is also shown in FIG. 1. Type 0 data cell 22 with rendered image black 10 and input pixel value of P0={255, 255, 255, 255}, represents a 3-bit binary data of 000 52. Type 1 data cell 24 with rendered image purple 26 and input pixel value of P1 ={255, 0, 255, 0}, represents a 3-bit binary data of 001 54. Type 2 data cell 28 with rendered image magenta 30 and input pixel value of P2={0, 0, 255, 0}, represents a binary data of 010 56. Type 3 data cell 32 with rendered image red 34 and input pixel value of P3={0, 255, 255, 0}, represents a binary data of 011 58. Type 4 data cell 36 with rendered image yellow 38 and input pixel value of P4={0, 255, 0, 0}, represents a binary data of 100 60. Type 5 data cell 40 with rendered image cyan 42 and input pixel value of P5={255, 0, 0, 0,}, represents a binary data of 101 62. Type 6 data cell 44 with rendered image green 46 and input pixel value of P6={255, 255, 0, 0}, represents a binary data of 110 64. Type 7 data cell 48 with rendered image white 50 and input pixel value of P7={0, 0, 0, 0}, represents a binary data 111 66. In this coding scheme, pixel values for each color separation is set to be either 255 or 0, which means that independent of the screening technology used inside the printer (cluster dot screen or stochastic screen) and independent of the screen cell size and screen frequency, the binary pixel value after screening is either 1 or 0 across the entire data cell area.

To decode the 3-bit binary digital data encoded data cells, the printed eight data cells are scanned with a 600 spot per inch high resolution color CCD scanner. Most commonly used CCD color image scanners have CCD image sensing elements arranged in a group of three with red, green and blue filter to measure the reflectance of the red light, green light and the blue light of the scanned image. Once a pictorial image is scanned, the color scanner generates a image file, which has three color components: R (red), G (green) and B (blue). Each color component pixel value is usually represented by a 8-bit binary data indicating the measured reflectance for the corresponding light source. Therefore, the scanned image pixel value can be represented by a 24-bit value:

$$S=\{r, g, b\}.$$

The averaged scan image pixel value for a data cell is obtained by dividing the summation of the pixel values of all the pixels within the data cell, by the total number of pixels of the data cell. Since data cell type 7 48 is white and has no inks, it should have the maximum number of reflecting light for red, green and blue lights. Assuming the reading of the averaged scan image for data cell type 7 48 is S7={r7, g7, b7}, the values of r7, g7, b7 can be used to normalize the readings of all the other data type's averaged scan image pixel value, to obtain a relative data for each data cell type. FIG. 2 shows a plot of the normalized scan image pixel values for all the data cell types in R 84 G 86 B 88 color space. It can be seen that data cell type 7 48 has no inks and it has the maximum value: S7={1.0, 1.0, 1.0} 68. Data cell type 0 22 has all four inks and it should absorb maximum amount of lights. The reading of the averaged scan image pixel value is S0={0, 0, 0} 70. The cyan ink has the optical characteristic of absorbing the red light and reflecting green and blue lights. The reading of the averaged scan image pixel value for data cell type 5 40 is S5={0.1, 0.3, 0.75} 76. Optical characteristics of the magenta ink is that it absorbs green light and reflects red and blue lights. The reading of the averaged scan image pixel value for data cell type 2 28 is S2={0.75, 0.1, 0.2} 82. The yellow ink absorbs blue light and reflects red and green light. The reading of the average scan image pixel value for data cell type 4 36 is S4={1.0, 1.0, 0.2} 78. Data cell type 3 32 has a combination of yellow and magenta inks which should absorb blue and green lights and reflect red light. The reading of the averaged image pixel value for a data cell type 3 32 is S3={0.75, 0.1, 0.1} 80. Data cell type 6 44 has a combination of cyan and yellow inks which should absorb red and blue light and reflect green light. The reading of the averaged scan image pixel value is S6={0.1, 0.3, 0.2} 74. Data cell type 1 24 has a combination of cyan and magenta inks which should absorb red and green light and reflect blue light. The reading of the averaged scan image pixel value for data cell type 1 24 is S1={0.1, 0.1, 0.2} 72. Based upon the optical properties of each data cell type, the reading of the averaged scan image pixel values of the data cells can be used to decode into 3-bit binary digital data.

Data cell type 2 28 has only magenta ink which should absorb green light and reflect red and blue light. But the reading of S2 ={0.75, 0.1, 0.2} 82 indicates the reflectance of the blue light is low. This is due to the effect of higher density of the magenta ink used by the printer, i.e., the amount of the magenta ink per unit area is too thick which causes the low reflectance of the blue light. Similarly, the data cell type 5 40 has cyan ink only, which should absorb red light and reflect green and blue light. But the reading of the S5={0.1, 0.3, 0.75} 76 suggests that the density of the cyan ink is also too high. As a result, the reflectance of the blue light for data cell type 1 24 and the reflectance of the green light for data cell 6 44 are also too low. In order to reduce the ink densities of the cyan and magenta ink, and to increase the noise immunity during scanning and data decoding, the pixel value of cyan and magenta color components of the input image file for all the data types is reduced from 255 to 123. FIG. 3 shows a table of a modified encoding scheme. Data cell type 1 90 with a rendered image of light purple 92, has an input pixel value of P1={123, 0, 123, 0}. Data cell type 2 94 with rendered image of pink 96 has an input pixel value of P2={0, 0, 123, 0}. Data cell type 3 98 with rendered image of orange 100, has an input pixel value of P3={0, 255, 123, 0}. Data cell type 4 102 with rendered image yellow, has an input pixel value of P4={0, 255, 0, 0}. Data cell type 5 106 with rendered image of light blue 108, has an input pixel value of P5={123, 0, 0, 0}. Data cell type 6 110 with rendered image of light green 112, has an input pixel value of {123, 255, 0, 0}. Setting input pixel value equals to 123 for a specific color separation, pixels within the data cell are screened against a screen table of a halftone cell by the halftoning mechanism within the printer. If the pixel value is larger than the threshold value, the binary output is 1 and ink is rendered on this specific spot. If the pixel value is smaller than the threshold value, no ink will be rendered on this laser spot. Depending upon the screening method used (a cluster dot screen outputting varying dot size or a stochastic screen outputting varying number of dots per unit area) only a portion of the pixels within the data cell have ink and portion of the pixels within the data cell have no ink. As a result, lighter shades of colors are produced. In FIG. 3, data cell type 2 94 has an input pixel value of P2={0, 0, 123, 0}. The rendered image is pink 96 and the ink density of the magenta ink is reduced.

With this modified coding scheme, the rendered images of all eight different data cell types are again scanned with a 600 spot per inch high-resolution CCD color scanner. The output image file generated by the scanner is captured, and the average scan image pixel value for each data type is calculated. FIG. 4 shows the normalized plot of the averaged scan image pixel value for different data cell types in the RGB color space. It is normalized with respect to the data cell type 7 48, the white cell 50, which has the maximum reflectance of the red, green and blue lights.

$S0 = \{0, 0, 0\}$    114
$S1 = \{0.4, 0.4, 0.5\}$    116
$S2 = \{0.9, 0.4, 0.6\}$    118
$S3 = \{0.9, 0.4, 0.2\}$    120
$S4 = \{0.9, 0.9, 0.2\}$    122
$S5 = \{0.4, 0.6, 0.9\}$    124
$S6 = \{0.4, 0.6, 0.2\}$    126
$S7 = \{1.0, 1.0, 1.0\}$    128

As it is shown in FIG. 4, the averaged scan image pixel values of the eight different data cells types in the RGB color space are farther apart from each other. This will provide better noise immunity during the decoding process when converting the scanned image of the data cells into 3-bit binary digital data.

On reading, the printed two-dimensional color symbology is scanned with a high resolution 600 spot per inch color CCD scanner and average scan pixel value of each data cell are compared with the expected pixel values 114, through 128 of the 8 unique data types to decode the data cell into a 3-bit binary data. The following method of the present invention can be used for decoding:

Assume the average pixel values for a data cells is expressed by:

$$D = \{R, G, B\}$$

where R, G, B are the normalized reading in each color space.

Two threshold values are defined in each color component as follows:

| | |
|---|---|
| R1 = 0.2 | R2 = 0.6 |
| G1 = 0.2 | G2 = 0.75 |
| B1 = 0.35 | B2 = 0.75 |

The following algorithm is used to decode D into a unique data type:

| | |
|---|---|
| (1) If R1 > R | (The possible data types are 0) |
| and G1 > G | (The possible data types are 0) |
| and B1 > B | (The possible data types are 0, 3, 4, 6) |

The data cell D is type 0.

| | |
|---|---|
| (2) If R2 > R > R1 | (The possible data types are 1, 5, 6) |
| and G2 > G > G1 | (The possible data types are 1, 2, 3, 5, 6) |
| and B2 > B > B1 | (The possible data types are 1, 2) |

The data cell D is type 1.

| | |
|---|---|
| (3) If R > R2 | (The possible data types are 2, 3, 4, 7) |
| and G2 > G > G1 | (The possible data types are 1, 2, 3, 5, 6) |
| and B2 > B > B1 | (The possible data types are 1, 2) |

The data cell D is type 2.

| | |
|---|---|
| (4) If R > R2 | (The possible data types are 2, 3, 4, 7) |
| and G2 > G > G1 | (The possible data types are 1, 2, 3, 5, 6) |
| and B1 > B | (The possible data types are 0, 3, 4, 6) |

The data cell D is type 3.

| | |
|---|---|
| (5) If R > R2 | (The possible data types are 2, 3, 4, 7) |
| and G > G2 | (The possible data types are 4, 7) |
| and B1 > B | (The possible data types are 0, 3, 4, 6) |

The data cell D is type 4.

| | |
|---|---|
| (6) If R2 > R > R1 | (The possible data types are 1, 5, 6) |
| and G2 > G > G1 | (The possible data types are 1, 2, 3, 5, 6) |
| and B > B2 | (The possible data types are 5, 7) |

The data cell D is type 5.

| | |
|---|---|
| (7) If R2 > R > R1 | (The possible data types are 1, 5, 6) |
| and G2 > G > G1 | (The possible data types are 1, 2, 3, 5, 6) |
| and B1 > B | (The possible data types are 0, 3, 4, 6) |

The data cell D is type 6.

| | |
|---|---|
| (8) If R > R2 | (The possible data types are 2, 3, 4, 7) |
| and G > G2 | (The possible data types are 4, 7) |
| and B > B2 | (The possible data types are 5, 7) |

The data cell D is type 7.

The worst-case noise immunity between the threshold values and the expected pixel values of the 8 unique data types 114 through 128 is 0.15 in any color space. For example, the expected reading of the blue component is 0.6 for data type 2 and the threshold values are G1=0.2, G2=0.75. Data cells with the reading of blue component between 0.2 and 0.75 is decoded to be data type 2 assuming red and green pixel values also meet the requirements specified in the algorithm. Therefore, the worst-case tolerance to noise is G2−0.6=0.15 for the blue component. It can be seen that the threshold values are also farther apart from each other, if the expected average pixel values of the eight unique data cell types in the RGB color space are farther apart from each other. This will increase the noise immunity during data cell decoding.

For a 3-bit binary digital data encoding scheme, each data cell represents a 3-bit binary digital data, as it is shown in FIG. 1 and FIG. 3. Three horizontal adjacent data cells are used to represent a digital byte with the left cell representing the most significant bits and the right cell representing the least significant bits. FIG. 5*a* shows that the first data cell 130 is used to represent the three most significant bits of a byte b7 b6 b5 132. The second data cell 134 is used to represent bits b4 b3 b2 136 of a byte, and the third cell 138 is used to represent the two least significant bits of a byte b1 b0 plus a parity bit P 140. For even parity, the parity bit P 140 is generated by the following equation:

$$P = b7 + b6 + b5 + b4 + b3 + b2 + b1 + b0$$

where + is the exclusive or operator. b7 through b0 are the data bits and P is the parity bit. On reading, a syndrome bits is generate by checking parity of each byte including the data bits and the parity bit.

$$S = b7 + b6 + b5 + b4 + b3 + b2 + b1 + b0 + P$$

where the +is the exclusive or operator.

If there is odd-number of bits having errors, the syndrome bit of the error byte is equal to logic 1, otherwise it is equal to logic 0. Therefore, the error locations of error bytes with odd-number of bits having errors can be identified. The information is used for error detection and correction scheme purposes.

The standard ASCII code is used to encode any alpha-numerical character with a digital byte or 3 data cells. For example, the character 'A' is coded with 0100 0001 according to ASCII coding table, which can be represented by 3 data cells: 010 (data cell type 2), 000 (data cell type 0), followed by 010 (data cell type 2) with the parity bit P=0.

A data block composed of a collection of data cells in a two-dimensional matrix form is used for large amount of digital information storage. FIG. 5*b* shows a data block of 102 rows by 102 columns of data cells. For each row, there are 96 data cells 142 and 6 horizontal check cells 144. The 96 horizontal data cells in a row represent 32 consecutive bytes with 3 data cells per byte. For example, the first data byte is composed of data cells 150, 152, 154 with data cell 150 representing the most significant 3 bits. For each column, there are 96 data cells 146 and 6 vertical check cells 148. Reed-Solomon codes are used to generate the six horizontal check cells and the six vertical check cells with the capability of detecting and correcting a maximum of 3 random errors in each row, and detecting and correcting a maximum of 3 random errors in each column. Reed-Solomon error correction codes, well-known in the prior art, are best suitable for this application, since the Reed-Solomon code is symbol oriented, and each data cell is a symbol which represents 3 binary bits. A data cell error could be caused by a one-bit error, two-bit error or all three-bit error. Error correction means replacing the erroneous data cell with the correct one.

The Reed-Solomon codes are implemented from a finite field of GF(8), with the encode polynomial $$g(x) = (x+1)(x+\alpha)(x+\alpha^2)(x+\alpha^3)(x+\alpha^4)(x+\alpha^5)$$

The horizontal check cells are generated by finding the remainder of dividing the horizontal data cell polynomial by the encode polynomial g(x). The vertical check cells are also generated by finding the remainder of dividing the vertical data cell polynomial by the encode polynomial g(x). On reading, the following steps are performed to the decoded binary data from the CCD scanned image file, for error detection and correction of each row:

(1) Six syndromes are generated by finding the remainder of dividing the complete row data cell polynomial including the check cells by each factor of the generator polynomial.

(2) The coefficients of an error locator polynomial are calculated. When this step is started, the number of errors is unknown. One method of computing coefficients of the error-locator polynomial first assumes a single error. If this assumption is found to be incorrect, the number of assumed error is increased by one, and so on.

(3) The roots of the error locator polynomial are found to determine error location vectors.

(4) The logs of error locator polynomial are calculated to obtain error locations.

(5) Once the error location vectors are known, the syndromes equations becomes a system of linear equations with error values as unknown. The error values are calculated.

(6) The symbols at error locations are replaced with the correct ones.

The parity checking of each byte can also be used to assist the finding of error locations of step 4, if the errors are errors due to odd-number of bits. The above steps are repeated for each column for error detection and correction in the vertical direction. With the above disclosed data block design, which includes a parity bit for each byte, 6 horizontal Reed-Solomon check cells for each row, and 6 vertical Reed-Solomon check cell highly reliable data storage unit is realized with the capability of correcting 3 data-cell errors in each row and correcting 3 data-cell errors in each column.

Figure 6:
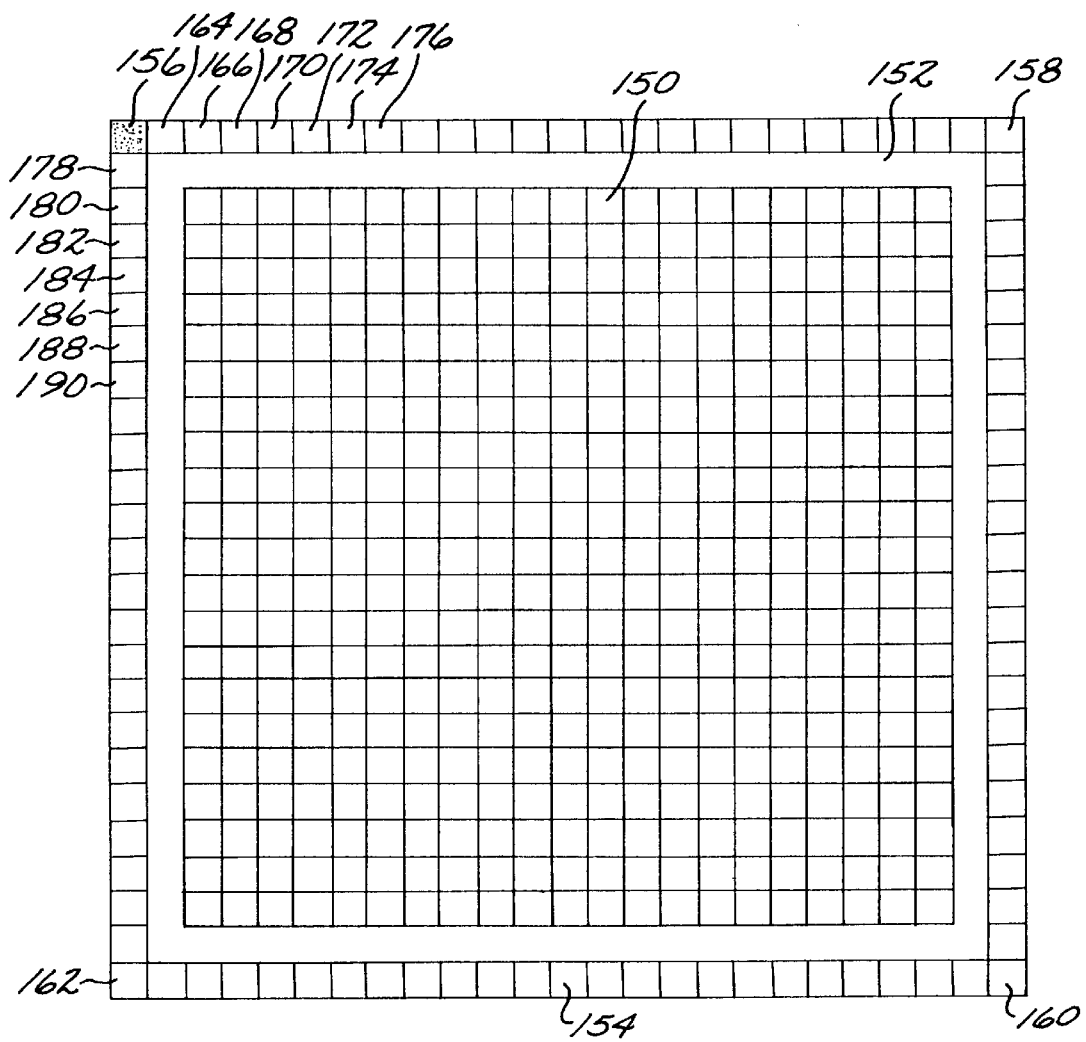
FIG. 6 illustrates the two-dimensional color symbology showing a data block enclosed by a boarder-cell ring with pre-determined data and a unique data type for the upper left corner boarder-cell used to provide orientation, spacing and auto-calibration information for reading.

The symbology of the present invention for high-density information storage using color half-tone micro-dots encoded with multi-bit digital binary data, also includes boarder cells as it is illustrated in FIG. 6. The two-dimensional data block including the horizontal and vertical check cells, 150 is first enclosed by a ring of white data cells 152 (data cell type 7 48). Outside the white data cell ring 152 is a boarder cell ring 154. The boarder cell ring has four corners 156, 158, 160 and 162. The top left corner data cell 156 of the boarder cell ring is assigned data type 0 22 (the black data cell) The other three corner data cells 158, 160 and 162 are assigned to be other data types. The top left corner data cell 156 can be used for orientation and alignment purpose during reading and data decoding. Since the symbol can be scanned at any arbitrary orientation and angle, searching for the top left corner data cell with data type 0 will enable the decoding software to determine the angle of image rotation for proper orientation and information decoding. The white data cell channel 152 between the boarder cell 154 and the data cell block 150 is used to isolate the data cell block from the boarder cell ring. The boarder cell ring comprises data cells with known data type for each cell. As an example, the horizontal data cells next to the top left corner 156 can be assigned data type 1 for cell 164, data type 2 for cell 166, data type 3 for cell 168, data type 4 for cell 170, data type 5 for cell 172, data type 6 for cell 174, data type 7 for cell 176 and so on. Similarly, the vertical boarder cells below the top left corner cell 156 can also be assigned data type 1 for cell 178, data type 2 for cell 180, data type 3 for cell 182, data type 4 for cell 184, data type 5 for cell 186, data type 6 for cell 188 and, data type 7 for cell 190. The purposes of setting the boarder cells with known data types are two-fold: first, it can be used as ruler to determine the spacing between data cells in either the horizontal or the vertical direction; second, it can provide an auto-calibration function during data decoding. On reading, the scanned image file of the data block contains a two-dimensional array of pixel values. It is necessary to know the number of pixels in the horizontal direction and the number of pixel in the vertical direction for each data cell in order to differentiate the pixel values of one data cell from the next one. This information of the horizontal and vertical spacing can be obtained by examining the number of pixel of each boarder cell, since the data type of each boarder cell is known. Auto-calibration is an important function provided by the boarder cells. The colors and reflectance of the printed symbol vary from each other, depending upon the printer used, and the age of usage. A printed symbol used in the field for a long period of time could be subject to sun-lights or other adverse conditions which causes the colors of the micro-dots to fade. When decoding the scanned image pixel values of the data cell to determine the data type, it is necessary to adjust the thresholds according to the usage and fading of the colors. It can be accomplished by measuring the pixel values of the boarder cells with known data types and to adjust the thresholds used to decode the data cell. This is because the color of the boarder cells for a particular symbol should track the colors of the data cells, if colors are fading after a period of usage. The above-disclosed approach reduces errors and provides a highly reliable method of data decoding.

Figure 7:
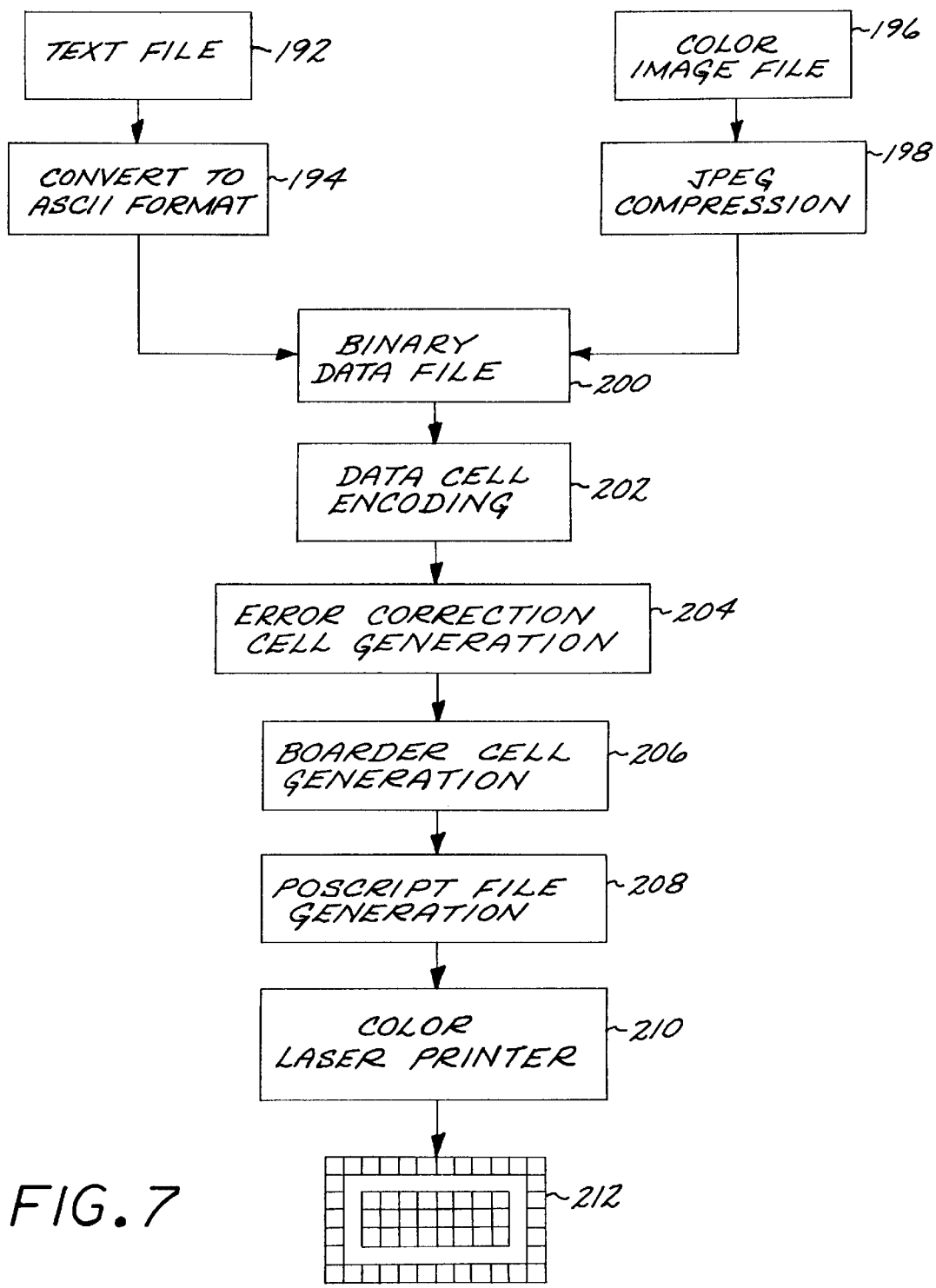
FIG. 7 is a flow chart depicting detailed steps to create a two-dimensional color symbology for information storage of a text file or a compressed color image file by using a color laser printer and different computer software modules.

The flow diagram for creating a two-dimensional color micro-dot symbol for storing a large amount of text data, or a compressed color image data, is shown in FIG. 7. An alpha-numerical text file 192 can be converted to a binary data file 200 by using ASCII data format conversion 194. Similarly, a binary data file 200 could also be generated by using JPEG compression 198 of a continuous tone color image data file 196 in either RGB or CYMK color space. The binary data file is encoded 202 with color half-tone data cells with each data cell representing 3-bit binary data according to the encoding table of the present invention. Horizontal and vertical error correction cells are generated 204 by dividing the data cell polynomial by the encoding polynomial using Reed-Solomon codes. Boarder cells and corner cells with pre-determined data types are also embedded 206 around the symbol. The complete symbol including the data cell block and the boarder cells, is converted into a Postscript file 208 which contains the information of physical size, location and colors of each data cell described in industrial standard printer interface high-level language. The Postscript file is then sent to a high resolution 600 spot per inch high resolution laser printer 210 for the printing of a two-dimensional color symbol 212.

On reading, the printer symbol 214 of a two-dimensional color micro-dots encoded with digital data is scanned with a high resolution 600 spot-per-inch color CCD scanner 216. As a result, a scanned image data file 218 in R(red), G(green), and B(blue) color space is created with each pixel value indicating light reflectance of red, green and blue lights for that particular spot. First, the image data file 218 has to be rotated 220 to the proper orientation for further data processing. This is accomplished by searching the top left corner boarder cell of data type 0 and finding the angle of the edges of the boarder cells with respect to the reference lines of the scanned image, since the printed symbol could be scanned at any arbitrary angle reference to the scanner. The next step is to compute the average scan image pixel value of each boarder data cell to obtain the horizontal and vertical spacing information for the data cell, the pixel values for each data type used to adjust the thresholds for differentiating the eight different data types. Based upon this information, the pixel values of the data block 224 can be converted into data cells and binary data with each cell representing 3 bits. Digital byte data are created by combining three neighboring data cells. Parity checking 226 is also performed for each byte. The locations of bytes with parity error are recorded which can be used to assist the error correction process in identifying the error byte location. The horizontal and vertical check symbols are used to perform the Reed-Solomon error detection and error correction 228 to generate the corrected data file 230. The alpha-numerical text file 232 can be generated by conventional ASCII decoding of the binary data file 230. For color images, the image file can be created by decompressing the binary data file 230 with conventional JPEQ decompression software 234. The final decoded text data file or color image file 236 can be displayed on the computer CRT or outputted to a printer or transmitted to a remote data center for further information processing via computer local network or internet.

Figure 8:
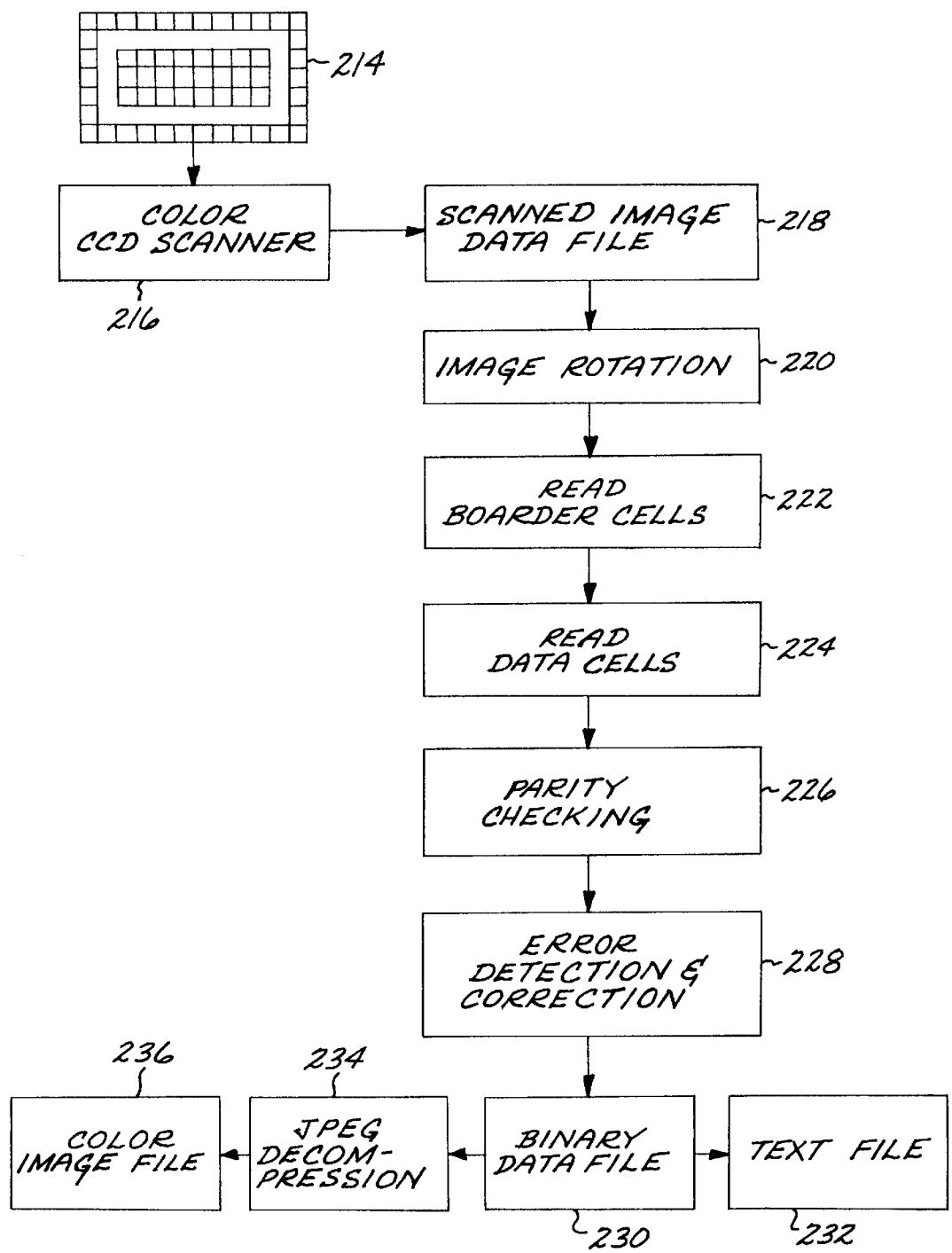
FIG. 8 is a flow chart depicting detailed steps to decode a two-dimensional color symbology and reproduce the represented text file or decompressed color image file by using a color CCD scanner and different computer software modules.

The present invention of creating a two-dimensional color micro-dot symbol for text information storage can also be applied to foreign language text files. Since the basic data unit of the data block 142, shown in FIG. 5b is a digital binary byte, and standards exits to encode foreign language characters into digital bytes, it is feasible to use the present invention to create color micro-dot symbols for information storage of foreign language characters. For example, it takes 3 bytes to encode a Chinese character versus 1 byte for ASCII codes. Therefore, to encode a foreign language text file, ASCII code 194 in the flow diagram of FIG. 7 is replaced with the coding table of the corresponding foreign language. Also, the ASCII code 232 with the coding table of the encoded foreign language in FIG. 8 is replaced to generate the foreign language text file.

Examples of the encoding/decoding steps of the present invention are as follows:

A. Data Cell Encoding:

For example, the word "Hello" is ASCII coded as follows:

| | | |
|---|---|---|
| H: | 0100 | 1000 |
| e: | 0110 | 0101 |
| l: | 0110 | 1100 |
| l: | 0110 | 1100 |
| o: | 0110 | 1111 |

For each byte (8 bits) representing one alpha-numerical character, a parity bit is added as the least significant bit.

| | | |
|---|---|---|
| H: | 0100 | 10000 |
| e: | 0110 | 01010 |
| l: | 0110 | 11000 |
| l: | 0110 | 11000 |
| o: | 0110 | 11110 |

From the encoding table of FIG. 3, each 3 bit binary data is encoded with one data cell type.

| | | | |
|---|---|---|---|
| H: | 010 (data cell type 2) | 010 (data cell type 2) | 000 (data cell type 0) |
| e: | 011 (data cell type 3) | 001 (data cell type 1) | 010 (data cell type 2) |
| l: | 011 (data cell type 3) | 011 (data cell type 3) | 000 (data cell type 0) |
| l: | 011 (data cell type 3) | 011 (data cell type 3) | 000 (data cell type 0) |
| o: | 011 (data cell type 3) | 011 (data cell type 3) | 110 (data cell type 6) |

Figure 10:
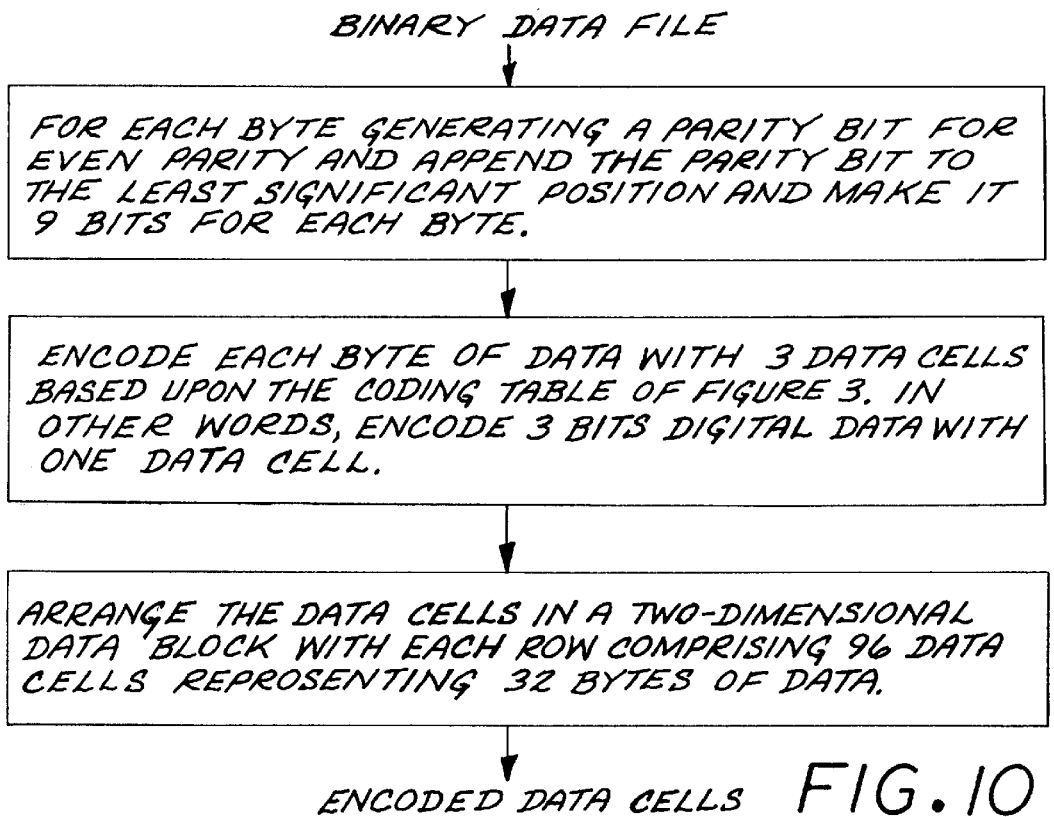
FIG. 10 is a detailed data cell encoding flow diagram.

To represent the word "Hello", 15 data cell are thus used, with the data type (color) sequence as shown in FIG. 9. The encoding sequence flowchart is illustrated in FIG. 10.

B. Error Detection and Correction Cell Generation

The Reed-Solomon code to generate error detection and correction symbols is available in the prior art. The present invention modifies the prior art concept by providing software that uses the Reed-Solomon code to generate both horizontal and vertical error detection and correction cells in the data block design.

Error detection and correction cell generation are done by software.

An example of generating check cells follows. Referring to FIG. 11, the first row of the data block is first examined. The 96 data cells are known which represents some data. Each data cell is coded with 3 bit binary data.

Assuming that the first data cell is type 7 (white cell representing binary data 111), the second data cell is type 2 (pink cell representing binary data 010), and the third data cell is type 1 (purple cell representing binary data 001).

According to finite field theory $$GF(2^3)$$

a finite field is defined by P(x) $x^3+x+1$ the first data cell type 7 representing binary data 111 can also be represented by $\alpha^5$.

The second data cell type 2 representing binary data of 010, can also be represented by $\alpha^1$.

The third data cell type 1 representing binary data of 001, can also be represented by $\alpha^0$.

The 96 known data cells of the first row can also be expressed by a polynomial $p=\alpha^5 x^{95}+\alpha^1 x^{94}+\alpha^0 x^{93}+ \ldots +\alpha^n x^0$ Using the Reed-Solomon code, encode polynomial =

$$(x+1)(x+\alpha)(x+\alpha^2)(x+\alpha^3)(x+\alpha^4) = x^6 + \alpha^{94}x^5 + \alpha^{10}x^4 + \alpha^{136}x^3 + \alpha^{15}x^2 + \alpha^{104}x + \alpha^{15}$$

$$\text{Encode polynomial} \sqrt{\frac{\text{first row data polynomial}}{\text{remainder}}}$$

The first row data polynomial is divided by the encode polynomial.

The remainder=$r^5x^5+r^4x^4+r^3x^3+r^2x^2+r^1x^1+r^0$ $r^5, r^4, r^3, r^2, r^1, r^0$ are the coefficients of the remainder.

Figure 13:
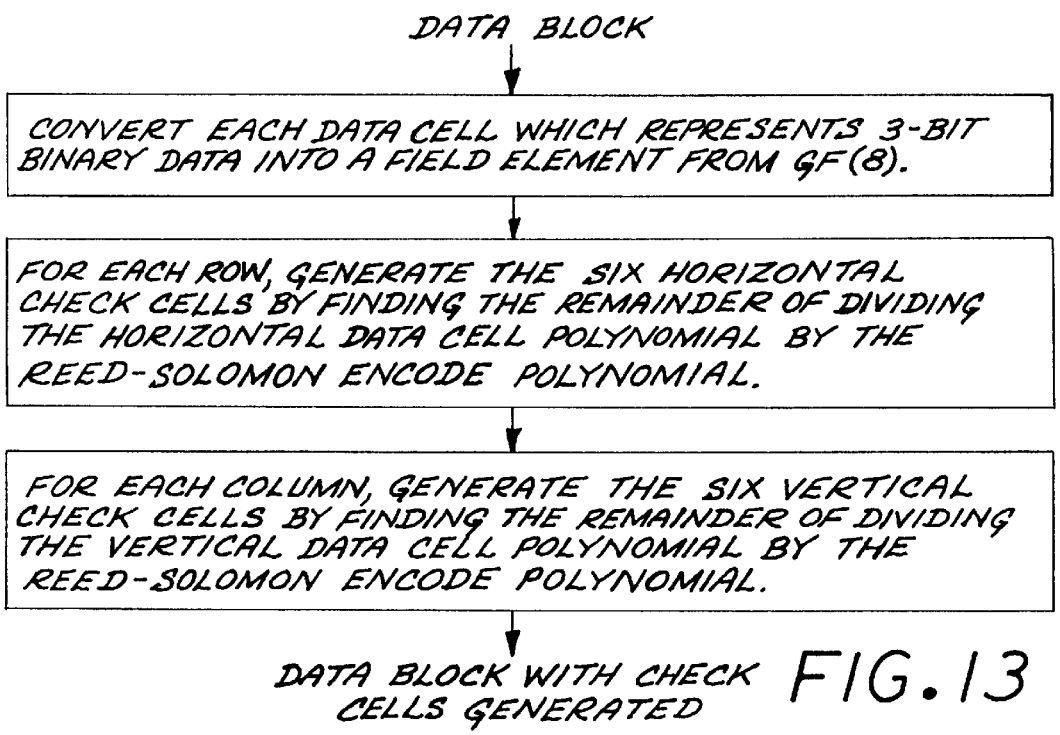
FIG. 13 is a detailed flow diagram for generating the horizontal and vertical check cells using Reed-Solomon error correction codes.

It is assumed that $r^5=\alpha^3$, $r^4=\alpha^6$, $r^3=\alpha^1$, $r^2=\alpha^0$, $r^1=0 r^0=\alpha^5$ The first row check cells are the remainder as shown in FIG. 12. The error detection and correction cell generation flowchart is shown in FIG. 13. In essence, the check cell is the remainder of dividing the data cell polynomial by the encode polynomial. The process is repeated for each row and each column.

C. Boarder Cell Generation

As noted hereinabove, the data block 102 rows×102 columns is first enclosed by a white data cell (data type 7) ring.

A boarder cell ring is generated by allocating fixed data types to fixed locators. For example, the top left corner boarder cell is assigned to data type 0 followed by data type 1, data type 2, data type 3, data type 4, data type 5, data type 6, data type 7, etc.

The complete two-dimensional color symbology is converted to a raster image data file, the vertical scan direction being the fast scan direction, the horizontal scan direction being the slow scan direction. The color laser printer prints images a scan line at a time in the fast scan direction and then moves to the next scan line until the whole paper is completely scanned.

Four image data files have to be generated one for each color separation: cyan, magenta, yellow, black. Referring to FIG. 3, pixel value and data type tables, and assuming a single vertical scan line scanning a data type 0 and a data type 2 data cell in sequence, the output pixel values will be as follows:

C.ascii image data file (cyan)

255, 255, 255, 0, 0, 0 for the scan line y.ascii image data file (yellow) 255, 255, 255, 0, 0, 0 m.ascii image data file (magenta)

255, 255, 255, 123, 123, 123 k.ascii image data file (black)

255, 255, 255, 0, 0, 0

Figure 14:
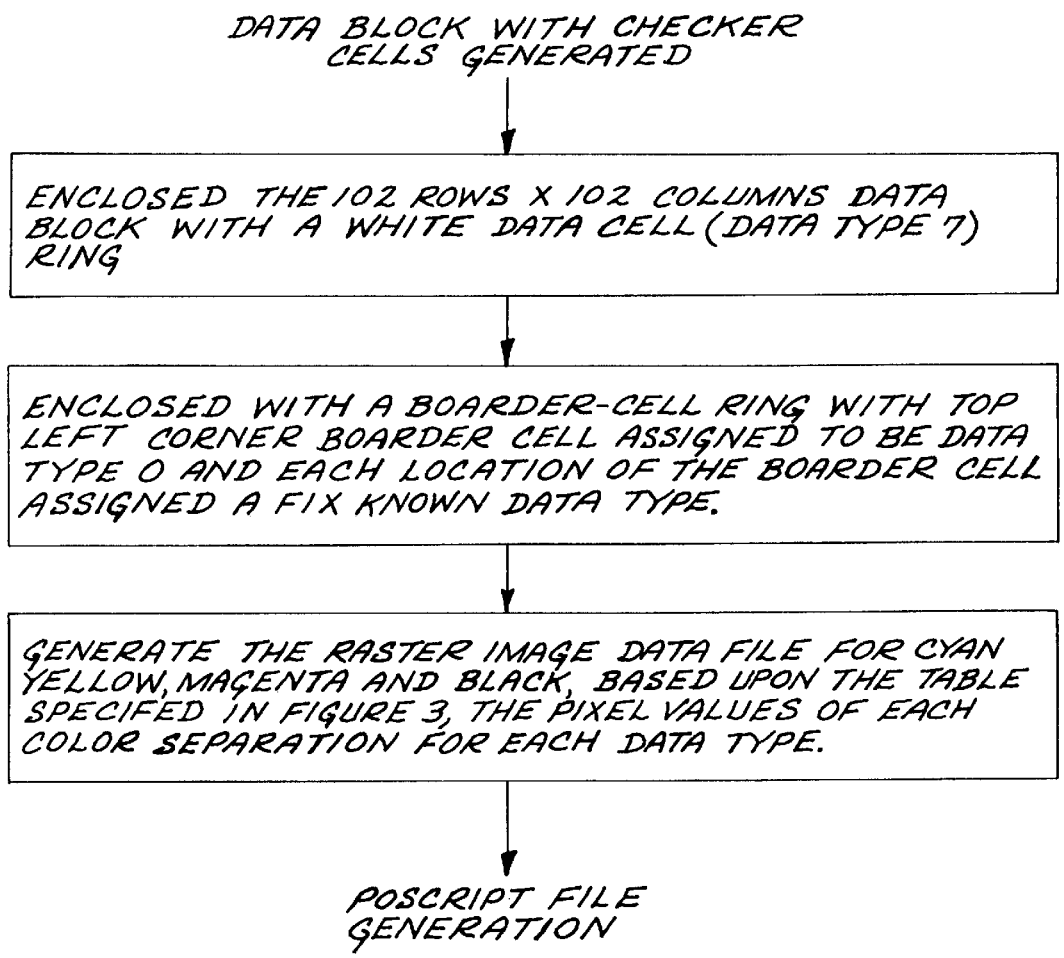
FIG. 14 is a detailed diagram for generating the boarder cell ring of the two-dimensional color symbology.

A boarder cell generation flowchart is shown in FIG. 14.

The same technique can be applied to the newly developed color laser printer with photographic resolution enhancement technology which contains special photo inks with lighter shades of magenta and cyan, providing six colors of inks compared with conventional four color inks. Using light cyan and light magenta inks, data cells coded with 4-bit binary data with sufficient noise immunity is also feasible.

It should be noted that any PC with a Pentuim based processor can run the software for the encoding/decoding steps at sufficient speed. A higher performance work station, such as the Sun Sparc 5 workstation can run the software at higher speeds.

The software preferably used to run the computer are:

1. Encoding software written in C++ language.
2. Decoding software written in C++ language.
3. Standard Window programming for user interface.
4. Standard software package to drive the laser printer.
5. Standard software package interfacing with CCD scanner, such as the commercially available Adobe Photostop.

Referring to FIG. 7, blocks 192, 194 . . . 208 are software written in C++; the color laser printer 210 can be a HP color laser jet or a Xerox Docucolor 40.

Referring to FIG. 8, color scanner 216 may be a UMAX color scanner (600spi) and blocks 218, 220 . . . 236 are software written in C++ language While the invention has been described with reference to its preferred embodiment, it will be understood by those skilled in the art and where changes may be made and equivalence may be substituted for elements thereof without departing from the true spirit and scope of the invention. In addition, many modifications may be made to adapt to a particular situation or material to the teaching of the invention without departing from its essential teachings.

What is claimed is:

1. A machine readable data structure comprising:

a two-dimensional data block with multiple rows and multiple columns of printed color data cells used for large amount of digital data storage, each said color data cell being coded with multiple-bit digital binary data, a plurality of said horizontal neighboring color data cells representing a digital byte, each said row within the data block containing data cells and check cells, each said column within the data block containing data cells and check cells; and a boarder-cell ring enclosing said two-dimensional data block; and wherein each said color data cell represents a multiple-bit digital binary data and the colors selected to represent multiple-bit digital binary data meeting the requirement of maximum noise immunity on reading in red, green, and blue color spaces.

2. The data structure of claim 1 wherein said structure is formed on a nonvolatile read only device.

3. The data structure as set forth in claim 1 wherein each said color data cells comprises two-dimensional color half-tone micro-dots of the same color generated by a printer with specified pixel values for cyan, yellow, magnenta and black color separations.

4. The data structure of claim 1 wherein data is decoded with reading devices measuring the reflectance of the data cells using various colored lights and comparing the pixel values in color space with multiple threshold values to decode the reflected signals into multiple-bit digital binary data.

5. The data structure of claim 1 wherein the said digital byte includes a parity bit used to detect errors of odd-number of bits for each byte on reading.

6. The data structure of claim 1 wherein each said row contains data cells and horizontal check cells, and each column also contains data cells and vertical check cells for error detection and error correction on reading.

7. The data structure of claim 1 wherein a selected corner data cell of said boarder-cell ring is assigned a unique data different from other corners of said boarder-cell ring for alignment and image rotation on reading.

8. The data structure of claim 1 wherein data of each data cell within said boarder-cell ring is pre-assigned in order to provide the horizontal and vertical spacing information during decoding of the scanned image data block.

9. The data structure of claim 1 wherein different data used to encode the multiple-bit digital binary data are assigned to known locations within the said boarder-cell ring to provide pixel values of each data type used to set thresholds for decoding the data block.

* * * * *